United States Patent [19] [11] 3,717,007
Kuhlenschmidt [45] Feb. 20, 1973

[54] ABSORPTION REFRIGERATION SYSTEM WITH MULTIPLE GENERATOR STAGES

[75] Inventor: Donald Kuhlenschmidt, Evansville, Ind.

[73] Assignee: Arkla Industries, Inc., Evansville, Ind.

[22] Filed: April 2, 1971

[21] Appl. No.: 130,659

[52] U.S. Cl. ..................62/101, 62/116, 62/476, 62/483
[51] Int. Cl. ...................................F25b 15/06
[58] Field of Search..............62/101, 116, 476, 483

[56] References Cited

UNITED STATES PATENTS

| 2,446,988 | 8/1948 | Flukes et al. | 62/483 |
| 3,137,144 | 6/1964 | Kaufman et al. | 62/141 |

FOREIGN PATENTS OR APPLICATIONS

| 969,268 | 5/1958 | Germany | 62/483 |

Primary Examiner—Meyer Perlin
Assistant Examiner—P. D. Ferguson
Attorney—Cushman, Darby & Cushman

[57] ABSTRACT

An air-cooled double-effect salt solution absorption refrigeration machine having high and low pressure generator stages is operated with a lower pressure in the evaporator than in the absorber. This achieves a desired low evaporator temperature while permitting the absorber to use an absorbent salt solution having a lower salt concentration and hence a lower crystallization temperature than would otherwise be necessary for the same cooling effect. In order to maintain the pressure differential between the evaporator and the absorber the vapor from the evaporator is compressed to absorber pressure before passing to the absorber. The compression is effected with an ejector device which employs refrigerant vapor flowing from the lower pressure generator stage as the driving fluid.

7 Claims, 2 Drawing Figures

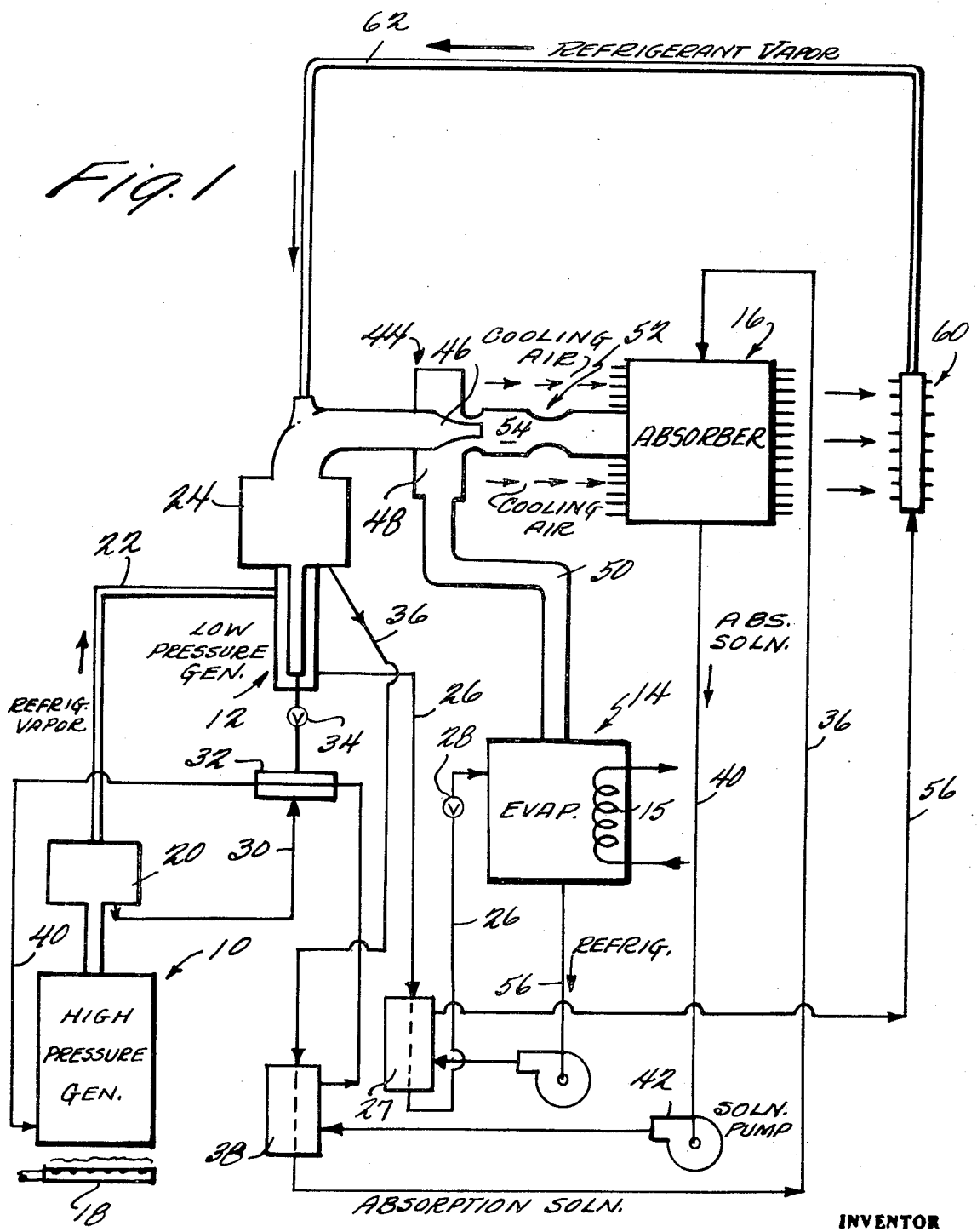

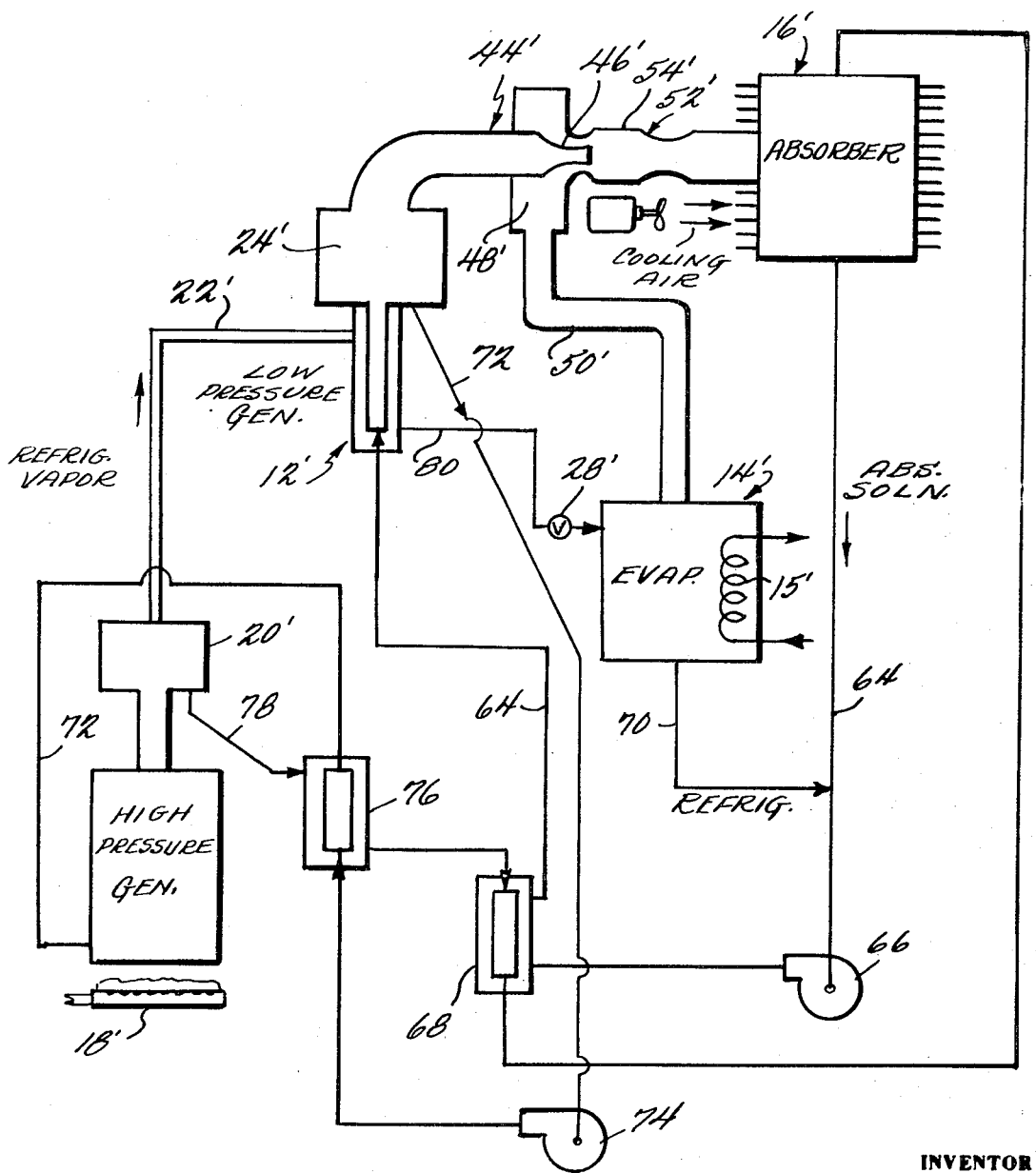

ABSORPTION REFRIGERATION SYSTEM WITH MULTIPLE GENERATOR STAGES

This invention relates to absorption refrigeration systems of the type in which a liquid refrigerant vaporizes to produce a cooling effect and is subsequently absorbed into a liquid absorbent solution. More in particular, the invention relates to improvements in such systems which permit the systems to be cooled with a relatively warm cooling medium such as ambient air.

One recognized problem with absorption refrigeration machines utilizing an aqueous salt solution as the absorbent is that cooling of the machines with a relatively warm coolant such as ambient air is not generally successful. The principal reasons for this lack of success are (1) the vapor pressure of the salt solution at the elevated temperatures resulting from air cooling result in an evaporator temperature that is too high for satisfactory cooling and/or (2) the salt solution has such a high crystallization temperature that it tends to form crystals at ambient temperature when the machine is shut down. By crystallization temperature is meant the temperature at which solid crystals begin to form as the salt solution is cooled. The problem is discussed more in detail below with reference to a machine employing an aqueous lithium bromide solution as an illustrative example of a typical absorbent. The principles of the invention are not, however, limited to the use of a particular absorbent.

In absorption refrigeration systems of the type under consideration the absorber pressure, for a given solution concentration, varies with the absorber temperature. The minimum practical absorber temperature obtainable is 10° – 20° F. above coolant temperature, or about 115° F. for 95° F. ambient air. Therefore, if one wishes to operate an air cooled unit he must use an absorbent solution which has a low enough vapor pressure at 115° F. to create the required vaporization in the evaporator. As a practical matter, the evaporator should be capable of chilling a water stream to 45° F., and for this purpose the evaporator temperature should be no higher than approximately 42° F. The latter temperature is produced during vaporization of water at 6.7 mm. Hg. Therefore, the solution leaving the absorber in a conventionally designed air-cooled system should have a vapor pressure no higher than 6.7 mm. Hg at 115° F. From available vapor pressure data for lithium bromide it is found that a 59.2 weight percent solution satisfies this requirement. The concentration of the entering solution must, of course, be higher, and for an operating system, the entering concentration will be about 62.2 percent. Since the latter solution has a crystallization temperature of about 112° F. such a solution is impractical since it will crystallize when the unit is shut down. If a more dilute entering solution, e.g., a 59 percent solution is employed in order to overcome the crystallization problem, then the leaving solution would have a concentration of about 56 percent and a vapor pressure of 9 mm. Hg. At this pressure the evaporator would operate at 49.5° F., obviously impossible for obtaining 45° F. chilled water.

In accordance with the principles of the present invention the evaporator is operated at a lower pressure than the absorber while the latter operates at a pressure which is consistent with the concentration of the salt solution and with the temperature of the available cooling medium. The low pressure vapor from the evaporator must, of course, pass to the higher pressure absorber, and in order to maintain the pressure differential the vapor flowing from the evaporator is compressed before passing to the absorber. The absorber can thus employ an absorbent having a vapor pressure at the temperature of the absorber which is higher than the operating pressure in the evaporator. This means that the absorbent can be more dilute in salt content than the absorbent which would normally be employed. That is, referring to the illustrative concentration figures in the above example, the present invention makes possible, for example, the use of a 59 percent lithium bromide solution in an air-cooled unit producing 45° F. water, whereas without the pressure differential and the pressurizing of the vapor from the evaporator this same solution would produce chilled water of 49.5° F. or higher.

The present invention is particularly concerned with multiple-effect refrigeration systems, that is systems which have high pressure and low pressure generator stages. The increase in the pressure of the refrigerant vapor flowing from the evaporator, which is required by the invention, can be accomplished in this type of system by employing the stream of refrigerant vapor produced in the low pressure generator as a driving fluid in an ejector or aspirator device connected into the system in a manner to conduct refrigerant vapor from the evaporator, to compress this vapor to a slight but nonetheless significant degree and to deliver it to the absorber at the operating pressure already existing therein.

The invention will be further understood from the following detailed description of two illustrative embodiments taken with the drawings in which:

FIG. 1 is a schematic illustration of a double-effect salt solution absorption refrigeration system embodying the principles of the present invention; and FIG. 2 is a schematic illustration of a modification of the system of FIG. 1.

Referring to FIG. 1 there is shown a double-effect aqueous salt solution absorption refrigeration system having a high pressure generator 10, a low pressure generator 12, an evaporator 14, a chilled water coil 15 associated with the evaporator 14, and an air-cooled absorber 16, all of which may be conventional components. An external heat source 18 is applied to the high pressure generator 10, and cooling is applied only to the absorber 16, since the low pressure generator 12 serves as a refrigerant vapor condenser. More specifically, hot, high pressure refrigerant vapor is separated from absorbent solution in a vapor separator 20 and is transmitted as by a line 22 to the low pressure generator 12 where it serves as the heat source for generating low pressure refrigerant vapor. This vapor is subsequently separated from absorbent solution in a vapor separator 24 and then transmitted to the absorber 16. The high pressure refrigerant vapor is condensed as it gives up its heat in the low pressure generator 12, and subsequently is transmitted by a line 26, through a heat exchanger 27 and then through a restriction 28 to the evaporator 14.

Absorbent liquid from the separator 20 is conducted through a line 30 and through a heat exchanger 32 and an expansion device 34 to the low pressure generator 12, where the liquid comes into heat exchange with hot high-pressure refrigerant vapor. Absorbent liquid (weak in refrigerant) from the separator 24 passes through a line 36 to a heat exchanger 38 and then through a restrictor and into the absorber 16.

In the absorber refrigerant vapor is absorbed into liquid absorbent in a known manner, and the resulting salt solution now high in refrigerant content passes into a line 40 which conducts it through a solution pump 42, and through the heat exchangers 38 and 32 into the high pressure generator 10.

All of the above is conventional in structure and operation in certain double-effect absorption refrigeration machines and has been presented in order to describe the environment of the present invention. The overall function of the system is, of course, to employ the vaporizing refrigerant in the evaporator 14 to absorb heat from the chilled water which may then be used for air conditioning purposes. The absorbed heat is rejected to the atmosphere by air cooling the absorber 16.

In accordance with the principles of the present invention, as indicated above, evaporator pressure is maintained below absorber pressure by continuously passing refrigerant vapor from the evaporator 14 into a low pressure zone. The vapor is then compressed to the existing absorber pressure and passed to the absorber at this pressure. This is accomplished by making use of the kinetic energy of the stream of refrigerant vapor which is generated by the low pressure generator and which would normally pass directly to the condenser in a conventional system. As seen in FIG. 1 there is provided an ejector device 44 or aspirator device or other venturi-type device in which the stream of refrigerant vapor from the separator 24 of the low pressure generator 12 is employed as a driving fluid to create suction on the evaporator 14 and to then pass the combined refrigerant vapors to the absorber 16. The ejector device 44, which is illustrated schematically, may be of any suitable construction and as shown includes an ejector nozzle 46 of reduced transverse cross section projecting into a suction chamber 48 which connects with the evaporator 14 by way of a conduit 50. The nozzle 46 converts the pressure head of the vapor into a high velocity stream which passes into a diffuser section 54 lowering the pressure in the suction chamber 48 and then compressing the vapor obtained from the evaporator and forwarding it to the absorber through a conduit 52.

Any surplus liquid refrigerant in the evaporator 14 can be employed to increase the mass of refrigerant vapor flowing through the ejector nozzle 46. This may be accomplished by first withdrawing cold liquid refrigerant from the evaporator 14 by means of a conduit 56 and pump 58 and then adding heat by passing the liquid through the heat exchanger 27 and then through a further heat exchanger 60 or boiler which is in heat exchange with the heated air leaving the absorber 16. Vaporized refrigerant then passes through a conduit 62 to the inlet of the ejector nozzle 46.

FIG. 2 illustrates an embodiment of the invention in which the same basic principles of operation pertain but in which the flow of absorbent liquid is somewhat different. Primed reference numerals indicate components which are the same as those identified by unprimed numerals in FIG. 1.

In FIG. 2 absorbent rich in refrigerant passes from the absorber 16' to the low pressure generator 12', rather than to the high pressure generator as in FIG. 1, by way of a conduit 64, pump 66, and heat exchanger 68. Surplus liquid refrigerant in the evaporator 14' also passes into the conduit 64 by way of a conduit 70. Absorbent from the separator 24' associated with the low pressure generator 12' passes to the high pressure generator by way of a conduit 72, pump 74, and heat exchanger 76. Absorbent from the separator 20' of the high pressure generator 10' passes to the absorber 16' by way of a conduit 78, the heat exchanger 76, and the heat exchanger 68. The refrigerant vapor from the high pressure generator 10' passes through the line 22' to the low pressure generator 12' where it is condensed to liquid which passes to the evaporator 14' through a line 80 and the restriction 28'.

The more specific operation of the systems of FIGS. 1 and 2 may be visualized by first assigning typical values to some of the operating variables. For purposes of illustration let it be assumed that the ambient air temperature is 95° F., that the solution entering the absorber is an aqueous lithium bromide solution containing 59 weight percent lithium bromide (exhibiting a crystallization temperature of about 60° F.), and that the leaving solution is 56 percent lithium bromide at a temperature of 115° F. The leaving solution has a vapor pressure of about 9 mm. Hg at this temperature, and this is, therefore, the lowest pressure obtainable in the absorber. As explained previously, if the evaporator is operated at the 9 mm. pressure of the absorber, as would be the case in conventional systems, the evaporator at 9 mm. pressure will produce a temperature of 49.5° F., too high to produce the typically desired 45° F. chilled water. However, in the systems of FIGS. 1 and 2 the evaporator is maintained at 7 mm. Hg by the action of the ejector device 44 or 44', and at this pressure the evaporator temperature is 42° F. The action of the ejector also compresses the low pressure refrigerant vapor to the higher pressure of 9 mm. so that the vapor can be absorbed in the absorber.

In the FIG. 1 embodiment additional aspirating action on the evaporator 14 is obtained by vaporizing any surplus liquid refrigerant from the evaporator 14 and introducing the resulting vapor upstream of the ejector nozzle 46. Were it not for the compression to the higher pressure, there would not be any absorption and, therefore, no heat transfer or in reality, as already stated, the evaporator would operate at the 9 mm. pressure and its concomitant unacceptable higher temperature.

From the above description it will be understood that the invention achieves the successful use of absorbent salt solutions in machines which employ ambient air or other relatively warm cooling medium. This advantage results from the ability of the system to employ less-concentrated, non-crystallizing salt solutions, while at the same time to develop a practicable low evaporator temperature in spite of the relatively high pressure and high temperature absorber.

What is claimed is:

1. A multi-pressure absorption type refrigeration system comprising: an evaporator for evaporating liquid refrigerant; an absorber vessel for absorbing refrigerant vapor into a liquid absorbent, means for flowing a cooling fluid in heat exchange relationship with the liquid absorbent in said absorber; refrigerant vapor generator means including a high pressure generator vessel heated by a heat source and a low pressure generator vessel heated by hot refrigerant vapor generated in said high pressure generator; transfer and compressor means for receiving refrigerant vapor from said evaporator and for passing the vapor into said absorber vessel at a pressure greater than the pressure in said evaporator and about equal to the pressure existing in said absorber whereby said evaporator develops a lower temperature than would be developed at the pressure existing in said absorber, said means including a first refrigerant vapor conduit extending from said low pressure generator vessel and including an ejector device for effecting a region of high velocity and low pressure; a second refrigerant vapor conduit extending between said evaporator and said region of low pressure whereby refrigerant vapor flows from said evaporator, mixes with refrigerant vapor from said first conduit and passes to said absorber.

2. Apparatus as in claim 1 including conduit means for conducting absorbent liquid rich in refrigerant from said absorber to said low pressure generator vessel.

3. Apparatus as in claim 1 including conduit means for conducting absorbent liquid rich in refrigerant from said absorber to said high pressure generator vessel.

4. Apparatus as in claim 3 including means for conducting unvaporized refrigerant from said evaporator, vaporizing such refrigerant and conducting the vapor to said absorber.

5. A method of operating a multi-pressure absorption type refrigeration system comprising: evaporating liquid refrigerant in an evaporator vessel; absorbing the resulting refrigerant vapor in a liquid absorbent in an absorber vessel at a higher pressure than exists in the evaporator; flowing a stream of solution of refrigerant in absorbent from the absorber through a first generator vessel and heating said first vessel by a heat source to expel refrigerant vapor, then flowing the solution through a subsequent generator vessel and heating said subsequent vessel by condensing the refrigerant vapor formed in said first vessel thereby forming a stream of refrigerant vapor; withdrawing refrigerant vapor from the evaporator vessel and compressing the withdrawn vapor to about the pressure existing in the absorber vessel by aspirating such vapor with said stream of refrigerant vapor obtained from said subsequent generator vessel; and passing the compressed vapor into the absorber vessel.

6. A method as in claim 5 wherein absorbent liquid rich in refrigerant passes from the absorber vessel to the first generator vessel, and wherein unvaporized refrigerant in the evaporator vessel is withdrawn from the evaporator vessel, vaporized and passed into the aspirating stream of vapor flowing from the subsequent generator.

7. A method as in claim 5 wherein absorbent liquid rich in refrigerant passes from the absorber to the subsequent generator vessel.

* * * * *